Figure 3:
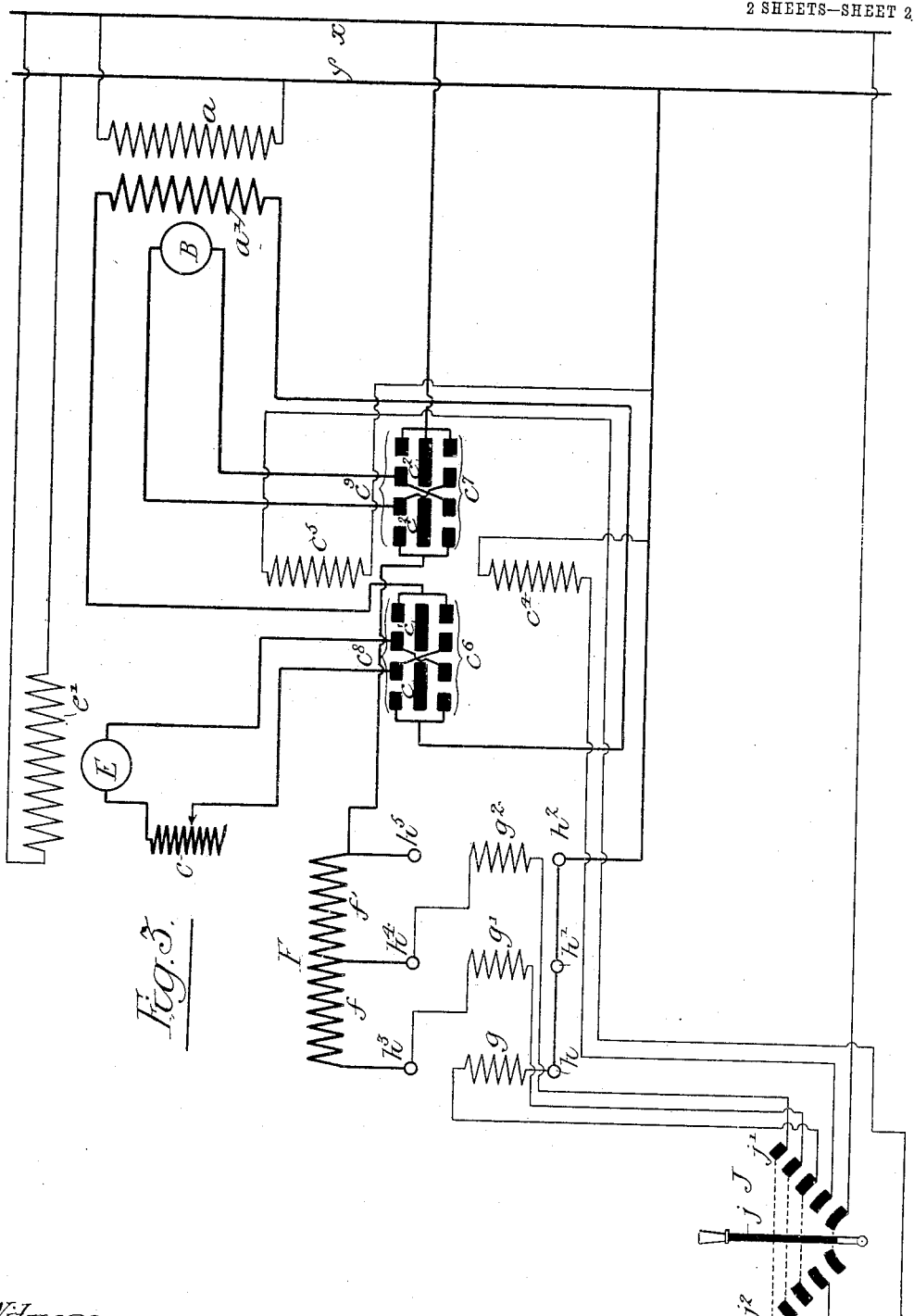

No. 810,269. PATENTED JAN. 16, 1906.
A. C. EASTWOOD.
METHOD OF OPERATING ELECTRIC MOTORS.
APPLICATION FILED JULY 24, 1903.
2 SHEETS—SHEET 1.
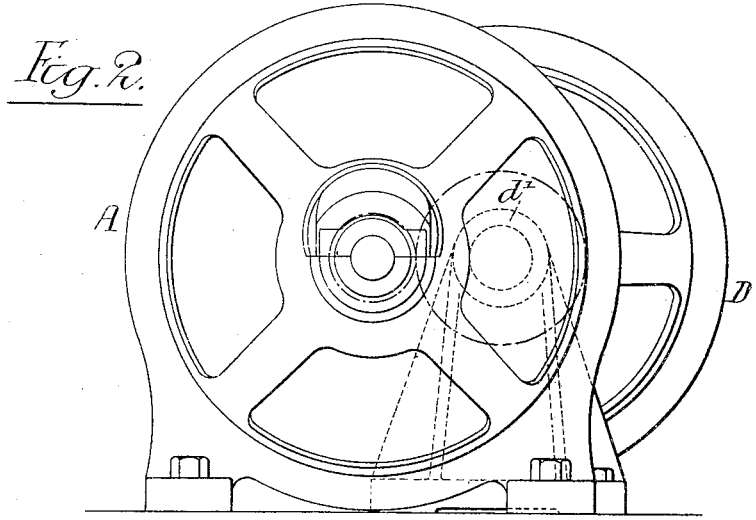
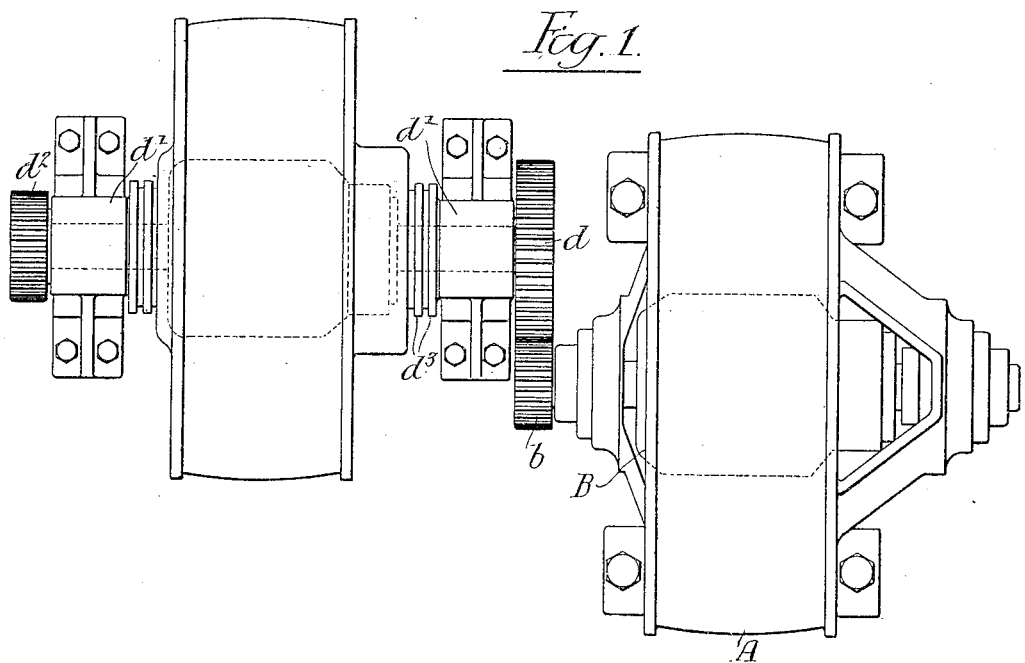
Witnesses:
Inventor:—
Arthur C. Eastwood,
by his Attorneys:
Howson & Howson No. 810,269. PATENTED JAN. 16, 1906.
A. C. EASTWOOD.
METHOD OF OPERATING ELECTRIC MOTORS.
APPLICATION FILED JULY 24, 1903.

2 SHEETS—SHEET 2.

Witnesses:
Augustus B. Coppes
James C. Krayer

Inventor:
Arthur C. Eastwood
by his Attorneys;
Howson & Howson

UNITED STATES PATENT OFFICE.

ARTHUR C. EASTWOOD, OF CLEVELAND, OHIO.

METHOD OF OPERATING ELECTRIC MOTORS.

No. 810,269. Specification of Letters Patent. Patented Jan. 16, 1906.

Application filed July 24, 1903. Serial No. 166,864.

*To all whom it may concern:*

Be it known that I, ARTHUR C. EASTWOOD, a citizen of the United States, and a resident of Cleveland, Ohio, have invented certain Improvements in Methods of Operating Electric Motors, of which the following is a specification.

My invention relates to an improved method of transforming electrical energy into mechanical energy; and it consists more particularly of a method for operating a pair of electrical machines of which one has one element movably connected to the movable element of the other machine.

The object of the invention is to provide a method of control for electric machines of the character noted by which it shall be possible for said machines to automatically control the amount of current consumed by them during operation, and thereby provide protection from the injurious effects of overloads.

A further object of the invention is to provide a method for the operation of electric machines which shall permit of the rotation of the armature of a machine even when the load operated thereby has been increased to such an extent that it cannot be moved.

In the accompanying drawings, Figure 1 is a plan view of an electric machine which may be operated according to my improved method. Fig. 2 is an end elevation of the machine shown in Fig. 1, and Fig. 3 is a diagrammatic view illustrating the electrical connections employed in carrying out my invention.

In the above drawings, A represents the frame of a motor having its shunt field-winding $a$ excited directly from the current-supply mains $x$ and $y$ and its armature B connected to the current-supply mains through a reversing-controller, (shown in diagram at C,) whereby the direction of rotation of said armature may be reversed to cause the closing and opening motions of a bucket. This motor is also provided with a separate field-winding $a'$, as set forth hereinafter.

As shown in Fig. 1, the armature B of the driving-motor is connected, by means of gear-wheels $b$ and $d$, to the revolubly-supported field-frame D of a second electric machine, which is carried in bearings $d'$, so as to be free to rotate. The armature E of this second machine is carried by a shaft supported in turn by the bearings $d'$, so as to be also freely rotatable within the field-frame, and to this armature-shaft is connected a gear-wheel $d^2$, to which is attached the receiving device or mechanism to be driven. Contact-rings $d^3$ and $d^4$ are provided for the passage of the armature and field currents of the second electric machine, its field $e'$ being excited directly from the supply-mains $x$ and $y$, as is the case of a shunt-wound motor. It is to be noted, however, that in some cases it may be desirable to have this second or clutch motor series or compound wound, though for the special form of work described above I prefer the shunt-winding, as shown in the diagram.

The armature E of the clutch-motor is connected in series with the separate field-winding $a'$ of the driving-motor through an adjustable resistance $e$. The driving-motor is provided with an extra-heavy field, so that as the current increases in the separate field-windings the speed of the armature will be materially reduced.

In order to prevent an injurious rush of current to the armature B of the driving-motor when this latter is started up, I provide any desired form of starting resistance F, this being in the present instance subdivided into two sections $f$ and $f'$.

In order to most efficiently control the above-described electric machines, I provide, in addition to the reversing-switch C, three other switches, actuated, respectively, by solenoids $g$, $g'$, and $g^2$, the armatures of these being so placed as to electrically connect, by means of suitable blades or movable members, the contacts $h$, $h'$, and $h^2$, which are connected to one of the supply-mains, with the contact-points $h^3$, $h^5$, and $h^5$, respectively, connected to different points of the starting resistance F.

In the case of the reversing-switch C, I mount four bridging-pieces $c$, $c'$, $c^2$, and $c^3$ upon an arm mechanically connected to a bar carrying the armature of two solenoids $c^4$ and $c^5$, by which said arm may be actuated to cause the bridging contacts to engage either one of two sets of contact-fingers $c^6$ and $c^7$ or $c^8$ and $c^9$.

The five solenoids I actuate with current directly from the supply-mains through the medium of a controlling-switch J, which switch, as shown in the diagrammatic sketch, Fig. 3, may consist of a pivoted arm $j$, mounted so as to form electrical connection between the contacts of one or the other of two sets $j'$ or $j^2$.

Before starting up the machine to operate a load I close whatever switches may be necessary to excite the two field-windings $a$ and $e'$ and then move the lever $j$ of the controlling-switch J, for example, to the right. The contact-points of this switch are so arranged that said lever will first bridge or electrically connect two pieces necessary to energize the solenoid $c^4$, with the result that the bridging contacts $c$, $c'$, $c^2$, and $c^3$ are brought into electrical connection with the fingers $c^6$ and $c^7$. The immediate result of this is that a circuit is formed between the supply-main $x$ through the armature B of the driving-motor and through the starting resistance F, so that as the lever $j$ is moved from its central position far enough to engage a third contact the solenoid $g$ is energized, with the result that the contacts $h$ and $h^3$ are bridged, allowing the current to flow in a complete circuit to the supply-main $y$ and causing the armature B to revolve.

Turning now to the clutch-motor, it will be seen that the operation of the solenoid $c^4$ also causes the contacts $c$ and $c'$ to bridge the two pairs of contacts $c^6$, with the result that as soon as current is generated in the armature E by the rotation of the field-frame D said current is permitted to flow through the separate field-winding $a'$ of the driving-motor in a closed circuit and back to the armature E through the adjusting resistance $e$.

As the lever $j$ is pushed to its extreme position toward the right it successively bridges the last two contacts $j'$, thereby successively energizing the solenoids $g'$ and $g^2$, with the result that the contact $h'$ is connected to the contact $h^4$ and then the contact $h^2$ engages the contact $h^5$, so that the resistance F is all cut out and the armature B is receiving current direct from the supply-mains. Motion of the lever $j$ in the opposite direction serves to reverse the direction in which the line-current flows through the armature B, and thereby reverses the direction of rotation of said armature and of the field-frame D. This naturally results in the reversal of the direction of rotation of the armature E, and in order that current generated by it shall properly energize the separate field-winding $a'$, in which the direction of flow of current must not be changed, I also reverse the connections between the armature E and the said separate winding $a'$. This reversal of action is secured by the energization of the solenoid $c^5$, which is suitably connected to the second set of contacts $j^2$ of the reversing-switch J.

Considering the driving-motor to be in operation, its armature will turn the field-frame of the clutch-motor around its armature, and such action will generate current in the armature E, which current will react with the revolving field-frame, so as to cause the armature itself to revolve in the same direction as said field-frame, though it will lag behind it by an amount sufficient to generate the necessary current to keep the load connected to it in motion. The current thus generated passes through the separate field-winding of the driving-motor, and as the load increases so as to cause the armature to lag behind the field by a greater amount the current generated will increase in magnitude, still further strengthening the field of the driving-motor. As a result the armature of the driving-motor is caused to slow down, as is also the rotating field-frame of the clutch-motor. The further increase of the load continues to increase the amount of slip between the armature and field of the clutch-motor until finally a point is reached where the speed of the field member will just represent the requisite amount of the slip. In such case the speed of the armature of the clutch-motor will be zero and the load will be at rest. It will be thus seen that when a certain critical load is reached the armature of the clutch member will come to rest, while, however, the field-frame is still being rotated, though at a comparatively low speed, by the driving-motor. The clutch-motor will thus be acting as a generator, and the current generated will be limited in amount by the resistance of the armature, the connections, and the separate field-winding of the driving-motor, together with the adjusting resistance $e$. This maximum or critical current may be varied by varying the amount of this adjusting resistance, which, however, will not require changing after once being fixed, so as to limit the current to a predetermined amperage. In the meantime the driving-motor will require from the supply-mains just sufficient current to compensate for the loss in the system and to hold the load from slipping, so that, although the clutch-motor, acting as a generator, will be delivering its maximum current when its armature is stalled, the amount of energy required from the line will as a whole be quite small, since said current from the clutch-motor is at a very low voltage—just sufficient to force it through the resistance of the armature, connections, separate field, and fixed resistance. In general I have found that this energy when the armature of the clutch-motor is at rest will represent less than twenty per cent. of the full-load current of the driving-motor.

I claim as my invention—

1. The method of utilizing electrical energy, which consists in first transforming electrical energy from a source of supply into mechanical energy, transforming said mechanical energy into electrical energy, transforming a portion of said electrical energy into mechanical energy to drive a load and employing another portion of said electrical energy to directly control the rate at which electrical energy from the source of supply is transformed into mechanical energy, substantially as described.

2. The method of utilizing electrical energy, the same consisting in first transforming electrical energy from a source of supply into mechanical energy, transforming said mechanical energy into electrical energy, transforming a portion of said electrical energy into mechanical energy to drive a load, and causing the remainder of said electrical energy to automatically and directly determine the rate at which mechanical energy is utilized, substantially as described.

In testimony whereof I have signed my name to this specification in the presence of two subscribing witnesses.

ARTHUR C. EASTWOOD.

Witnesses:
C. W. COMSTOCK,
J. E. WELLMAN.